Patented Aug. 22, 1944

2,356,130

UNITED STATES PATENT OFFICE 2,356,130

OLEFIN-DIOLEFIN COPOLYMERS

Robert M. Thomas, Union, and William J. Sparks, Elizabeth, N. J., assignors, by mesne assignments, to Jasco, Incorporated, a corporation of Louisiana No Drawing. Application September 6, 1941, Serial No. 409,908

25 Claims. (Cl. 260—79)

This application relates to hydrocarbon polymers, relates particularly to interpolymers or copolymers of an isoolefin with a diolefin and relates especially to sulfurizable interpolymers of isobutylene with a conjugated diolefin of six carbon atoms.

As is shown in our copending application, Serial No. 182,252, it has been found possible to produce an interpolymer of an isoolefin such as isobutylene with a conjugated diolefin such as butadiene by a low temperature technique, utilizing an active metal halide, or Friedel-Crafts type, catalyst dissolved in a low freezing solvent. The resulting polymers have molecular weights ranging from 15,000 to 150,000, and are reactive with sulfur in a curing reaction by which the plasticity of the polymer is largely destroyed and replaced by an elastic limit at which the material has a tensile strength ranging from 1,000 to 5,000 pounds per square inch and an elongation ranging from 300% to 1200%.

The resulting polymers are high grade materials suitable for replacement of natural rubber for many of its uses. The polymer does not, however, have all of the characteristics of natural rubber, nor all of the characteristics desirable for some particular uses, and, accordingly, means for modifying the characteristics of the material to adapt it to particular uses are important.

The present invention presents a new interpolymer of an iso-olefin, preferably isobutylene, with a conjugated diolefin having 6 carbon atoms; obtained by the application to a mixture of the iso-olefin and diolefin of an active metal halide catalyst dissolved in a low-freezing organic solvent such as ethyl or methyl chloride or carbon disulfide at temperatures between about −40° C. and −165° C. These new interpolymers are unique in their characteristics and substantially different from analogous interpolymers made from an iso-olefin interpolymerized with butadiene or with a 5 carbon diolefin; apparently because of the difference in substituents in the immediate neighborhood of the residual double bond from the diolefin in the interpolymer.

This group of diolefins, yielding a new and unique interpolymer, have the empirical formula $C_6H_{10}$. The preferred diolefin of this group is the 2,3-dimethyl butadiene-1,3, represented by the formula:

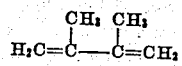

A second, isomeric, $C_6H_{10}$ diolefin, which may be called 1,2-dimethyl butadiene-1,3, is also very valuable in the same way. This has the formula:

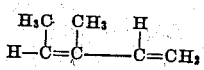

A third isomer in the form of the 1,3-dimethyl butadiene-1,3 is also very valuable:

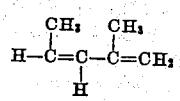

Likewise, the 1,4-dimethyl butadiene-1,3 or hexadiene-2,4 is useful and valuable as a copolymerizate; as is also the 1,1-dimethyl butadiene-1,3.

The homologous $C_6H_{10}$ diolefin, identified as hexadiene-1,3, or as 1-ethyl butadiene-1,3 is similarly useful, as is also the homologous $C_6H_{10}$ compound, identified as 2-ethyl butadiene-1,3.

Of these, the first mentioned, 2,3-dimethyl butadiene-1,3, is superior since it yields an interpolymer with higher molecular weight and superior properties generally. The second mentioned is nearly as good, and those following are adequate and usable.

Thus an object of the present invention is to prepare an interpolymer of an isoolefin such as isobutylene with an alkyl or dialkyl substituted butadiene, such as 2,3-dimethyl butadiene-1,3 and its $C_6H_{10}$ homologues, to modify and improve the characteristics of a low temperature rubbery interpolymer. Other objects and details of the invention will be apparent from the following description.

In practicing this invention, an olefinic mixture is prepared, consisting of the isoolefin, preferably isobutylene, with the diolefin, the isoolefin preferably being present in the ratio of from 80 to 99.5 parts with the diolefin in a proportion of 20 to 0.5 part. This olefinic mixture may be diluted with a diluent-refrigerant such as liquid ethylene or liquid ethane or liquid methane or mixtures of these several diluent-refrigerants together with other inert diluents such as liquid propane, liquid butane, liquid ethyl or methyl chlorides and the like, the diluent-refrigerant being present in the proportion of from one to 5 or 6 volumes per volume of mixed olefins. Alternatively, an excess of solid carbon dioxide may be utilized either with or without an auxiliary diluent such as propane, ethyl or methyl chloride or similar inert, low freezing substances. The catalyst preferably consists of a solution of an active metal halide such as aluminum chloride, bromide or iodide or uranium or titanium chloride dissolved in a low freezing solvent such as ethyl or methyl chloride or carbon disulfide or similar or homologous substance. The catalyst solution is preferably applied in the form of a spray or mist on to the surface of the rapidly stirred mixture of the olefins and diluent-refrigerant. The reaction proceeds rapidly to produce the desired solid, plastic, elastic polymer, to produce a polymer characterized by a molecular weight within the range of 15,000 to 150,000 and an iodine number within the range of 1 to 50.

The polymer may be combined with sulfur and appropriate fillers, plasticizers and the like, and suitable sulfurization aids such as "Tuads" (tetramethyl thiuram disulfide). The polymer, when so compounded, cures into an elastic, rubber-like substance having an elastic limit, a high tensile strength and a high elongation by the application of heat within a temperature range of 135° C. to 185° C. for a time interval ranging from 15 to 120 minutes.

EXAMPLE 1

A mixture of 98 parts of liquid isobutylene was prepared with 2 parts of 2,3-dimethyl butadiene-1,3, and 2 volumes of liquid ethylene per volume were added to the mixed olefins. The mixture was prepared in a reactor equipped with a powerful stirring device and provided with a cover to avoid loss of volatilized gaseous constituents. The reactor also was well heat insulated to reduce the rate of volatilization of the refrigerant by ambient heat. The catalyst was prepared by dissolving commercial anhydrous aluminum chloride in methyl chloride at the boiling point of the methyl chloride to yield a saturated solution containing 1.2% of aluminum chloride. This solution was then diluted with an additional amount of methyl chloride to produce a solution containing 0.6% of dissolved aluminum chloride. This solution was then precooled to a temperature slightly above the melting point of methyl chloride ($-97°$ C.), and sprayed on to the surface of the vigorously stirred mixed olefins through a misting nozzle. The polymerization proceeded rapidly and was approximately 80% complete within a few minutes.

When this stage of polymerization was reached, the polymerization mixture was diluted with approximately 0.1 volume of isopropyl alcohol to quench the catalyst and arrest polymerization. The solid polymer was then brought up to room temperature and was ready for further processing, including compounding.

The resulting interpolymer prepared from isobutylene and 2,3-dimethyl butadiene-1,3 was found to have a molecular weight of 110,000, and a molecular percentage of unsaturation of 1.64, as determined by iodine chloride (addition method).

EXAMPLE 2

The interpolymer of isobutylene and 2,3-dimethyl butadiene-1,3 was then compounded according to the following formula:

| | Parts |
|---|---|
| Interpolymer | 100 |
| Zinc oxide | 5 |
| Stearic acid | 3 |
| Sulphur | 3 |
| Tuads | 1 |

In preparing this compound, the interpolymer was worked briefly upon the mill for a time interval of approximately 5 minutes. Then the zinc oxide was added and thoroughly incorporated into the polymer by further working on the mill. Thereafter, the stearic acid and sulfur were simultaneously added, the mill temperature during this portion of the operation being maintained at approximately 125° C. When these ingredients were thoroughly incorporated, the mill was cooled to a temperature of approximately 60° C., the Tuads added quickly, the compound removed from the mill and cooled.

This prepared compound was then placed in a mold and cured at a temperature of 155° C. for 60 minutes to produce the desired cured rubber-like polymer. The cured polymer was found to have a tensile strength of 3,600 pounds per square inch with an elongation at break of 1100%.

EXAMPLE 3

A mixture similar to that in Example 1 was prepared with 99.5 parts of liquid isobutylene and 0.5 part of 1,4-dimethyl butadiene-1,3 and the polymerization conducted as in Example 1. The polymer was found to have a molecular weight of 130,000 and a mole percentage unsaturation of about 0.4%, as indicated by the iodine absorption method.

This polymer was compounded according to the formula in Example 2, cured as outlined in Example 2 and was found to have a similar high tensile strength and high elongation.

The other mono-alkyl and dialkyl substituted butadienes listed above were similarly polymerized with isobutylene and similarly found to yield desirable and advantageous polymers, which likewise were cured with sulfur and found to have similar high tensile strength and high elongations.

The benefits and advantages obtained by the use of the $C_6H_{10}$ diolefins instead of butadiene are many; particularly the $C_6H_{10}$ diolefins interpolymerize much more readily with the isobutylene than is the case with other diolefins. This is shown by the fact that in order to obtain in a copolymer an iodine number sufficiently high to indicate that there are one or two diolefin molecules interpolymerized with every 99 or 98 isobutylene molecules, it is necessary that the polymerization mixture contain 20 to 30% of butadiene with 80 to 70% of isobutylene; whereas with the $C_6H_{10}$ diolefins, the diolefin polymerizes with the isobutylene in practically the percentage in which it is present; that is, to obtain an iodine number sufficiently high to indicate that there are one or two $C_6H_{10}$ diolefins per 99 or 98 isobutylene molecules, it is only necessary that the mixture of isobutylene with $C_6H_{10}$ diolefin contain 1 or 2% of the diolefin. Also, the $C_6H_{10}$ diolefins have a very low poisoning effect upon the reaction and they permit of the making of much higher molecular weight copolymers than is possible when other diolefins are copolymerized with isobutylene and permit of the conjoined occurrence of both a high unsaturation and a high molecular weight; that is, it is possible to use as much as 10% of the $C_6H_{10}$ diolefin present to 90% of the isobutylene and obtain a high molecular weight copolymer. In contrast, butadiene strongly poisons the polymerization reaction and $C_5$ diolefins poison it to a less degree, and it is not possible to obtain high molecular weight materials, which are at the same time of high unsaturation. This is well shown by the following table:

TABLE 1

*Characteristic properties of butyl rubber from various diolefins*

| Run No. | Per cent diolefin | Mol. weight | Mol. per cent unsat. | Tensile strength | | | Per cent elongation | | |
|---|---|---|---|---|---|---|---|---|---|
| | | | | 20' | 40' | 60' | 20' | 40' | 60' |
| BUTADIENE (CONTROL) | | | | | | | | | |
| 1 | 20.0 | 69,000 | 0.92 | 2,800 | 3,050 | 3,450 | 1,125 | 1,050 | 1,050 |
| PURIFIED ISOPRENE | | | | | | | | | |
| 2 | 1.0 | 70,000 | 0.82 | 2,900 | 3,350 | 2,900 | 1,000 | 950 | 900 |
| 3 | 1.5 | 62,000 | 1.15 | 2,700 | 2,800 | 2,500 | 850 | 825 | 750 |
| 4 | 2.0 | 64,000 | 1.40 | 1,550 | 1,600 | 2,450 | 900 | 800 | 1,000 |
| 5 | 2.5 | 45,000 | 1.58 | 1,950 | 550 | 450 | 800 | 600 | 500 |
| 6 | 3.0 | | 1.65 | 1,100 | 350 | 400 | 750 | 525 | 525 |
| PURIFIED PIPERYLENE | | | | | | | | | |
| 7 | 1.0 | 74,000 | 0.94 | 2,000 | 2,600 | 3,300 | 1,175 | 1,075 | 1,050 |
| 8 | 1.5 | 62,000 | 1.70 | 1,650 | 3,200 | 3,350 | 1,050 | 1,075 | 1,000 |
| 9 | 2.0 | 42,000 | 2.13 | 1,700 | 2,750 | 2,850 | 1,125 | 1,025 | 950 |
| 10 | 2.5 | 30,000 | 2.47 | 1,850 | 2,350 | 1,700 | 1,100 | 975 | 875 |
| 11 | 3.0 | 36,000 | 3.10 | 1,350 | 1,400 | 450 | 1,100 | 925 | 625 |
| PURE 2,3-DIMETHYL BUTADIENE 1-3 | | | | | | | | | |
| 12 | 2.0 | 108,000 | 1.64 | 760 | 3,400 | 3,200 | 700 | 950 | 900 |
| 13 | 3.0 | | | 1,650 | 3,800 | 3,300 | 950 | 825 | 775 |
| 14 | 4.0 | 67,000 | 1.41 | 2,400 | 1,750 | | 850 | 750 | |
| 15 | 5.0 | 53,000 | 1.43 | 2,300 | 1,150 | | 850 | 750 | |
| 16 | 8.0 | 47,000 | 5.60 | | | | | | |

In this table the amount of the several diolefins added is given, together with the molecular weight obtainable, the molecule percentage of unsaturation, which is practically equivalent to the number of diolefin molecules per 100 molecules, and the tensile strength at 20, 40 and 60 minutes curing times, and the percent elongation at break for corresponding times of cure.

Thus the present invention provides a new and useful interpolymer of an isoolefin with an alkyl substituted butadiene of at least six carbon atoms in which the properties of the interpolymer are modified and improved by the presence of the substituted butadiene.

This application is a continuation-in-part of our copending applications Serial No. 182,252 filed December 29, 1937, and Serial No. 300,336 filed October 20, 1939.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. The process of preparing a solid plastic hydrocarbon interpolymer which is reactive with sulfur to give an elastic product comprising the steps of reacting together a major proportion of an aliphatic isoolefin having 4 to 7, inclusive, carbon atoms per molecule, with a minor proportion of an aliphatic diolefin having 6 carbon atoms per molecule, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

2. The process of preparing solid, plastic hydrocarbon interpolymer comprising the step of reacting together a low molecular weight aliphatic isoolefin having less than 8 carbon atoms per molecule with a low molecular weight aliphatic diolefin having 6 carbon atoms per molecule in the presence of a Friedel-Crafts catalyst dissolved in a solvent which forms no complex with the Friedel-Crafts catalyst and is liquid at the reaction temperature, the reaction being conducted at a temperature below 0° C.

3. The process of preparing solid, plastic hydrocarbon interpolymer which is reactive with sulfur to give an elastic product comprising the step of reacting together a major proportion of isobutylene with a minor proportion of a low molecular weight aliphatic conjugated diolefin having 6 carbon atoms per molecule in the presence of a Friedel-Crafts catalyst dissolved in an organic solvent which forms no complex therewith and is liquid at the reaction temperature, the reaction being conducted at a temperature between 0° C. and −160° C.

4. The process of preparing solid, plastic hydrocarbon interpolymers which are reactive with sulfur to yield an elastic product comprising the step of reacting together a major proportion of isobutylene with a minor proportion of dimethyl butadiene in the presence of a Friedel-Crafts catalyst dissolved in a solvent which forms no complex therewith and is liquid at the reaction temperature, the reaction being conducted at a temperature between 0° C. and −160° C.

5. The process of preparing solid, plastic hydrocarbon interpolymers which are reactive with sulfur to yield an elastic product comprising the step of reacting together a major proportion of isobutylene with a minor proportion of dimethyl butadiene in the presence of aluminum chloride dissolved in a solvent which forms no complex therewith and is liquid at the reaction temperature, the reaction being conducted at a temperature between −50° C. and −160° C.

6. The process of preparing solid, plastic, hydrocarbon interpolymers which are reactive with sulfur to give an elastic product comprising the step of reacting together a major proportion of isobutylene with a minor proportion of dimethyl butadiene in the presence of aluminum chloride dissolved in an alkyl halide which forms no complex with the aluminum chloride and is liquid at the reaction temperature, the reaction being conducted at a temperature between 0° C. and −160° C.

7. The process of preparing solid, plastic, hydrocarbon interpolymers which are reactive with sulfur to give an elastic product comprising the step of reacting together a major proportion of isobutylene with a minor proportion of dimethyl butadiene in the presence of aluminum chloride dissolved in ethyl chloride, the reaction being conducted at a temperature between 0° C. and −160° C.

8. The process of preparing solid, plastic, hydrocarbon interpolymers which are reactive with sulfur to give an elastic product comprising the step of reacting together a major proportion of isobutylene with a minor proportion of dimethyl butadiene in the presence of aluminum chloride dissolved in carbon disulfide, the reaction being conducted at a temperature between −50° C. and −160° C.

9. The process of preparing cured, solid, elastic hydrocarbon interpolymers comprising the step of reacting together a major proportion of isobutylene with a minor proportion of dimethyl butadiene in the presence of a Friedel-Crafts catalyst dissolved in an organic solvent which forms no complex therewith and is liquid at the reaction temperature, the reaction being conducted at a temperature between −50° C. and −160° C. and thereafter heating the polymer with sulfur and a sulfurization aid.

10. The process of preparing cured, elastic, hydrocarbon interpolymers comprising the step of reacting together a major proportion of isobutylene with a minor proportion of dimethyl butadiene in the presence of a Friedel-Crafts catalyst dissolved in a solvent which forms no complex therewith and is liquid at the reaction temperature, the reaction being conducted at a temperature between −50° C. and −160° C., and thereafter heating the polymer with sulfur and a sulfurization aid comprising tetramethyl thiuram disulfide.

11. A synthetic, solid, plastic, hydrocarbon interpolymer of a major proportion of an isoolefin having less than 8 carbon atoms per molecule with a minor proportion of diolefin having 6 carbon atoms per molecule the said polymer being characterized by a low unsaturation below an iodine number of 50, a molecular weight above 15,000 and reactivity with sulfur to yield a product of increased elasticity.

12. A synthetic solid, plastic, hydrocarbon interpolymer of a major proportion of isobutylene with a minor proportion of a conjugated diolefin having 6 carbon atoms per molecule, the polymer being characterized by a low unsaturation below an iodine number of 50, a molecular weight above 15,000, and reactivity with sulfur to yield an elastic product.

13. A synthetic solid, plastic, hydrocarbon interpolymer of a major proportion of isobutylene with a minor proportion of dimethyl butadiene, the polymer being characterized by a low unsaturation below an iodine number of 50, a molecular weight above 15,000, and reactivity with sulfur to yield an elastic product.

14. The process of preparing a solid plastic hydrocarbon interpolymer which is reactive with sulfur to give an elastic product comprising the steps of reacting together a major proportion of an aliphatic isoolefin having 4 to 7, inclusive, carbon atoms per molecule, with a minor proportion of a conjugated, linear aliphatic diolefin having 6 carbon atoms per molecule, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

15. The process of preparing solid, plastic hydrocarbon interpolymer comprising the step of reacting together a low molecular weight aliphatic isoolefin having less than 8 carbon atoms per molecule with a low molecular weight linear, conjugated, aliphatic diolefin having 6 carbon atoms per molecule in the presence of a Friedel-Crafts catalyst dissolved in a solvent which forms no complex with the Friedel-Crafts catalyst and is liquid at the reaction temperature, the reaction being conducted at a temperature below 0° C.

16. The process of preparing solid, plastic hydrocarbon interpolymers which are reactive with sulfur to yield an elastic product comprising the step of reacting together a major proportion of isobutylene with a minor proportion of a linear, conjugated dimethyl butadiene in the presence of a Friedel-Crafts catalyst dissolved in a solvent which forms no complex therewith and is liquid at the reaction temperature, the reaction being conducted at a temperature between 0° C. and −160° C.

17. The process of preparing solid, plastic hydrocarbon interpolymers which are reactive with sulfur to yield an elastic product comprising the step of reacting together a major proportion of isobutylene with a minor proportion of a linear, conjugated dimethyl butadiene in the presence of aluminum chloride dissolved in a solvent which forms no complex therewith and is liquid at the reaction temperature, the reaction being conducted at a temperature between −50° C. and −160° C.

18. The process of preparing solid, plastic, hydrocarbon interpolymers which are reactive with sulfur to give an elastic product comprising the step of reacting together a major proportion of isobutylene with a minor proportion of a linear, conjugated dimethyl butadience in the presence of aluminum chloride dissolved in an alkyl halide which forms no complex with the aluminum chloride and is liquid at the recation temperature, the reaction being conducted at a temperature between 0°C. and −160° C.

19. The process of preparing solid, plastic, hydrocarbon interpolymers which are reactive with sulfur to give an elastic product comprising the step of reacting together a major proportion of isobutylene with a minor proportion of a linear, conjugated dimethyl butadience in the presence of aluminum chloride dissolved in ethyl chloride, the reaction being conducted at a temperature between 0° C. and —160° C.

20. The process of preparing solid, plastic, hydrocarbon interpolymers which are reactive with sulfur to give an elastic product comprising the step of reacting together a major proportion of isobutylene with a minor proportion of a linear, conjugated dimethyl butadiene in the presence of aluminum chloride dissolved in carbon disulfide, the reaction being conducted at a temperature between —50° C. and —160° C.

21. The process of preparing cured, solid, elastic hydrocarbon interpolymers comprising the step of reacting together a major proportion of isobutylene with a minor proportion of a linear, conjugated dimethyl butadiene in the presence of a Friedel-Crafts catalyst dissolved in an organic solvent which forms no complex therewith and is liquid at the reaction temperature, the reaction being conducted at a temperature between —50° C. and —160° C. and thereafter heating the polymer with sulfur and a sulfurization aid.

22. The process of preparing cured, elastic, hydrocarbon interpolymers comprising the step of reacting together a major proportion of isobutylene with a minor proportion of a linear, conjugated dimethyl butadiene in the presence of a Friedel-Crafts catalyst dissolved in a solvent which forms no complex therewith and is liquid at the reaction temperature, the reaction being conducted at a temperature between —50° C. and —160° C., and thereafter heating the polymer with sulfur and a sulfurization aid comprising tetramethyl thiuram disulfide.

23. A synthetic, solid, plastic, hydrocarbon interpolymer of a major proportion of an isoolefin having less than 8 carbon atoms per molecule with a minor proportion of a linear, conjugated, aliphatic diolefin having 6 carbon atoms per molecule, the said polymer being characterized by a low unsaturation below an iodine number of 50, a molecular weight above 15,000 and reactivity with sulfur to yield a product of increased elasticity.

24. A synthetic solid, plastic, hydrocarbon interpolymer of a major proportion of isobutylene with a minor proportion of a linear, conjugated diolefin having 6 carbon atom per molecule, the polymer being characterized by a low unsaturation below an iodine number of 50, a molecular weight above 15,000, and reactivity with sulfur to yield an elastic product.

25. The process of preparing solid, plastic hydrocarbon interpolymers which are reactive with sulfur to yield an elastic product comprising the step of reacting together a major proportion of isobuylene with a minor proportion of 2,3-dimethyl butadiene-1,3 in the presence of a Friedel-Crafts catalyst dissolved in a solvent which forms no complex therewith and is liquid at the reaction temperature, the reaction being conducted at a temperature between 0° C. and —160° C.

ROBERT M. THOMAS.
WILLIAM J. SPARKS.